Feb. 24, 1959 J. GRUSSEN 2,874,413
APPARATUS FOR FORMING PLASTIC CLOSURES ON RECEPTACLES
Filed Feb. 23, 1954 3 Sheets-Sheet 1
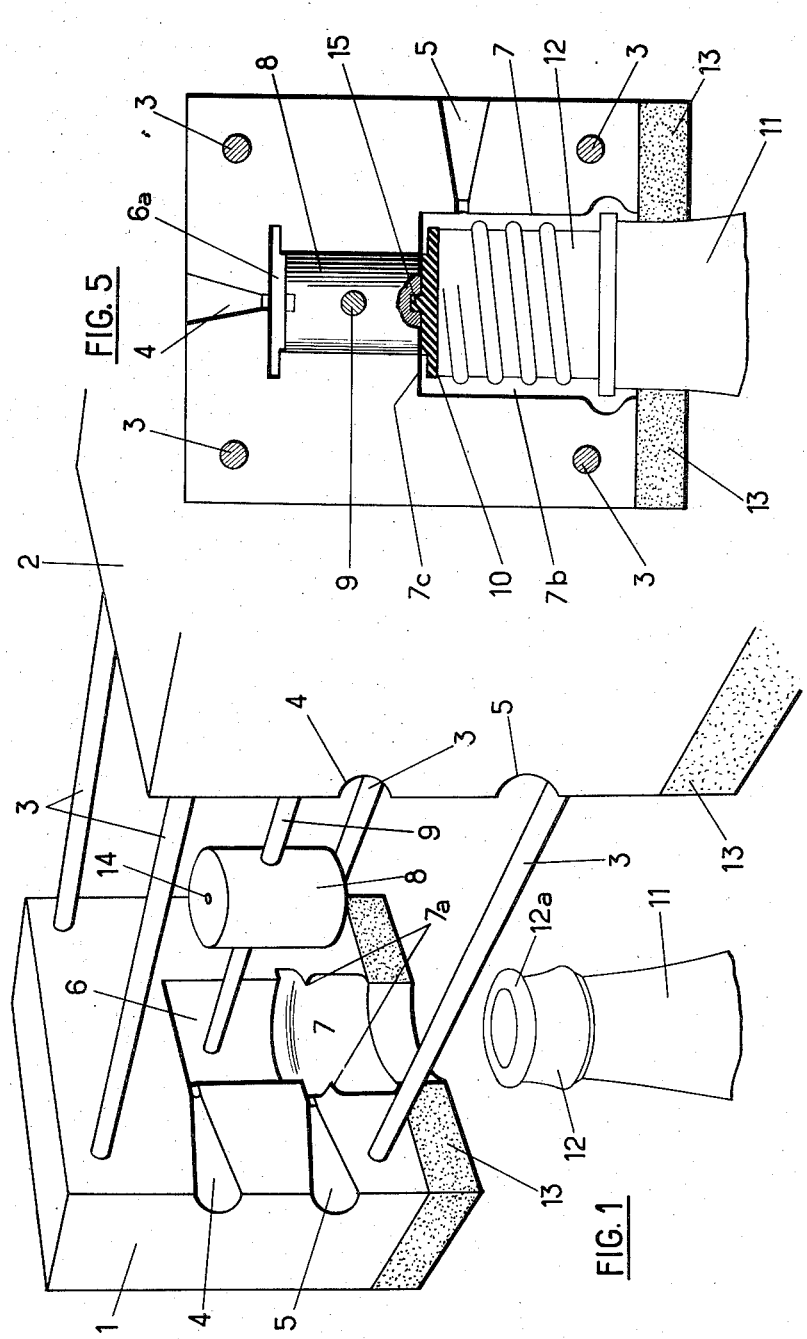
INVENTOR
J. GRUSSEN
BY: J. M. Engos
AGENT

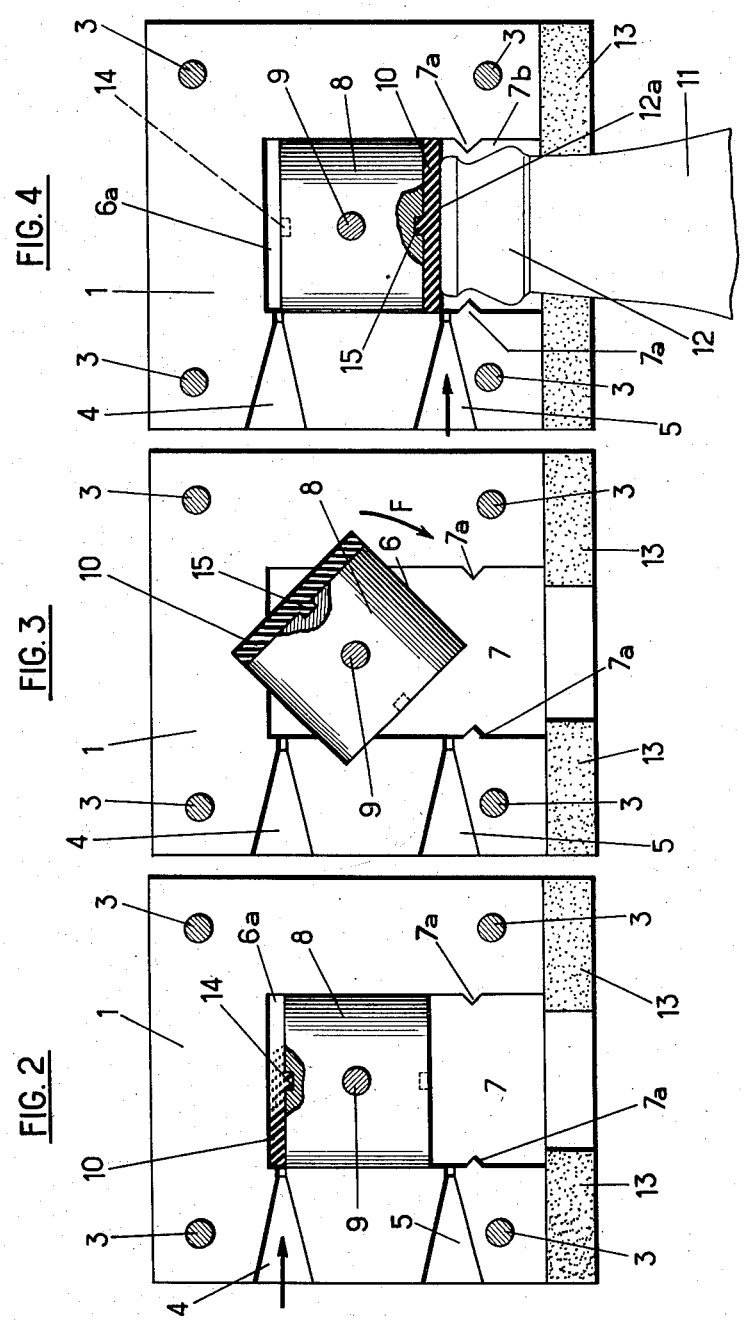

Feb. 24, 1959 J. GRUSSEN 2,874,413
APPARATUS FOR FORMING PLASTIC CLOSURES ON RECEPTACLES
Filed Feb. 23, 1954 3 Sheets-Sheet 3

INVENTOR
J. GRUSSEN
BY
AGENT

United States Patent Office 2,874,413
Patented Feb. 24, 1959

2,874,413
APPARATUS FOR FORMING PLASTIC CLOSURES ON RECEPTACLES

Jean Grussen, Paris, France

Application February 23, 1954, Serial No. 411,821

Claims priority, application France August 18, 1953

4 Claims. (Cl. 18—42)

This invention relates to the apparatus for forming permanent plastic closures directly on the receptacles they are intended to close.

Heretofore processes whereby closures have been molded directly on receptacles have been unsatisfactory because they have been found to be time consuming and expensive since the closures so molded were always temporary and they had to eventually be either substituted by or incorporated into distinct permanent closures subsequently applied on the recipient. For instance such temporary closures have included well known cork stoppers of all types, and plastic or metallic caps which were subsequently covered by a more permanent closure of metal.

The present invention has for its object to provide an improved apparatus for molding permanent plastic closures directly on the receptacles they are intended to close so that the application of temporary closures to said receptacles is eliminated.

Further it is one of the objects of this invention to afford a novel apparatus for forming closures for receptacles from two parts in two steps, the second of said steps comprising automatically making integral said parts and affixing said closure to the receptacle.

It is another object of the present invention to afford a novel apparatus for forming permanent closures in two alternate steps occurring simultaneously and whereby the production of receptacle closures is doubled for any time interval.

Other objects and features of the present invention will more fully appear from the following detailed description, taken in conjunction with the accompanying drawings, which illustrate several embodiments thereof, and in which Figure 1 is a fragmentary view showing one construction of the molding apparatus for forming the plastic receptacle closure according to one process of the invention.

Figures 2, 3 and 4 are side elevations of one of the mold platens of Figure 1 with a portion of the core broken away, shown in section, and in several positions during the process of forming the plastic closure on the neck of a receptacle.

Figure 5 is a view similar to Figure 4 but showing a modified construction of the mold cavity in the platen.

Figure 6:
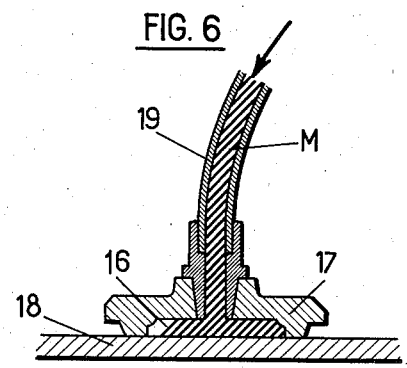
Figure 6 is a transverse section of a portion of a modified molding apparatus for forming the center part of a plastic receptacle closure according to a modified process.

Referring more particularly to Figures 1 through 4, the molding apparatus constructed according to the invention comprises two symmetrical platens 1 and 2 provided with leader pins 3 entering corresponding bores in the platens thereby guiding the latter into accurate closing position with respect to each other. The means (not shown) for displacing the platens may include any one of the well known presses used in the plastic and glassmaking industries.

The platens are provided with centering means 13 of cork or the like adapted to prevent overflowing of the fluid plastic composition when the platens are closed by engaging the sides of the receptacle to which the closure is to be affixed. Also each platen is provided with grooves 4 and 5 defining frusto conical restricted end passages for injecting the plastic composition also when the platens are closed.

Upper semi cylindrical recesses 6 in each platen define an upper cylindrical molding cavity 6a and lower semi cylindrical recesses 7 define a lower cylindrical chamber communicating with said cavity when said platens are closed. The lower chamber 7 is constricted by projecting lugs 7a formed intermediate the ends of cylindrical recesses 7. A leader post 9 entering corresponding bores in the platens supports for rotation by obvious means, not shown, a central cylindrical core member 8 having dimensions commensurate to fit snugly within a portion of recesses 6 and 7 again when the platens are closed. The core member is provided with cylindrical bores 14 located on the axis of the cylindrical core member for purposes described infra. The receptacle may obviously have any shape so long as the end of the receptacle to be closed is adapted to fit within the molding cavity and cylindrical chamber described above. The receptacle 11 as shown is a bottle having a neck 12 and a pouring lip 12a.

The projecting lugs 7a are effective to center the neck of the receptacle in the manner described below and to form a weaker surface portion on the neck of the receptacle closure for making the latter frangible.

Referring now to Figure 5, the molding apparatus shown therein is adapted to be used with pressurized receptacles and core member 8 is provided with a diameter smaller than the diameter of the molding cavity 6a. Furthermore the cylindrical chamber 7 for receiving the neck of the receptacle is defined by a counterbore sufficiently deep at 7c to extend above or be alined with the upper surface of plastic composition or central part 10 of the closure engaging the top of the receptacle. Thus, a portion of plastic composition 10 is covered over by the plastic composition introduced through passage 5 and into space 7c so that the receptacle closure is resistant to the pressure within the receptacle. It is noted that in this species of the invention the passage 4 is located above the core member 8 and not to the side as previously and this is done to further seal the interior of the platens from leakage past passage 4 even while the receptacle under pressure is being closed in cylindrical chamber 7.

In both of the constructions described above, the bores 14 are adapted to form projecting parts 15 on the central part of the plastic receptacle closure which are effective to hold central parts 10 on core member 8 during rotation thereof in the manner described below.

The operation of the molding apparatus shown in Figures 1–5 is as follows: Assuming the molding cycle to be starting, the mold platens 1 and 2 are brought together and the core member occupies the position shown in Figure 2 to define the upper cylindrical cavity 6a and a plastic composition is injected through passage 4. This plastic composition then forms central part 10 of the receptacle closure.

Subsequently, the platens 1 and 2 are separated sufficiently to permit core member 8 to rotate in the direction of arrow F, see Figure 3. When core member 8 assumes the position shown in Figure 4, the receptacle 11 is either manually or mechanically moved so that pouring lip 12a is in abutting relation with central part 10 of the receptacle closure. Thereupon, platens 1 and 2 are brought together again and the neck 12 of the receptacle 11 is centered within the lower cylindrical chamber 7, to form therewith the annular chamber 7b, by the centering means 13 and the projecting lugs 7a. The plastic composition is then injected through passage 5 and into the annular chamber 7b in order to form the peripheral skirt portion of the closure of the receptacle which welds itself automatically with the central part 10 to form an integral receptacle closure. It is noted that simultaneously with the injection of the plastic composition through passage 5 plastic composition is injected through passage 4 into the upper molding cavity 6a, now empty, so that the central part 10 of the next receptacle closure is formed simultaneously with the forming of the skirt portion and the finishing of the receptacle closure on the receptacle in the lower cylindrical chamber 7.

From then on the molding cycle is continuous since plastic material is simultaneously injected through passages 4 and 5 in order to form central part 10 of a receptacle closure in molding cavity 6a while a peripheral skirt portion of another receptacle closure is formed and molded on the central part previously formed and directly on the neck of a receptacle intended to be closed.

Thus, the method of injection forming plastic closures for receptacles described infra, comprises generally the steps of forming the central part of a closure at a first station, moving said central part from said first station to a second station, and forming and welding the peripheral skirt portion of said closure at said second staion to said central part simultaneously with the forming of a second central part at said first station.

Figure 7:
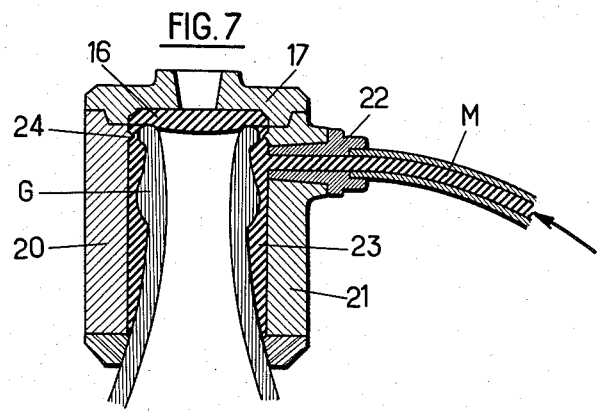
Figure 7 is a transverse section of the molding apparatus shown in Figure 6 and showing the remainder of the apparatus for forming the peripheral skirt portion of the plastic receptacle closure.
Figure 8:
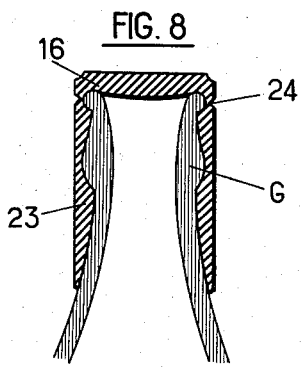
Figure 8 is a transverse section of the plastic receptacle closure formed by the molding apparatus of Figures 6 and 7 and of the neck of the receptacle to which it is attached.

Now referring to Figures 6, 7 and 8, an upper die member 17 is shaped to receive through conduit 19 the plastic composition M and form the central part 16 of the receptacle closure. The flat surface of member 18 defined the first lower die member for forming the lower surface of the central part 16.

Once the central part 16 is formed, the member 18 is removed and the neck portion G of a bottle or the like is placed in abutment with central part 16. Subsequently, upper die member 17 is seated on a pair of complementary lower die members 20 and 21, see Figure 7. Plastic composition M is injected through passage 22 and the peripheral skirt portion 23 of the closure is formed and welds itself to central part 16 and defines the receptacle closure shown in Figure 8.

In order to make the receptacle closure frangible, a peripheral groove 24 may be shaped in the upper part of skirt portion 23. Thus the closure may be removed from the receptacle by simply breaking the central part from the skirt portion through applying any appropriate means such as a cutting edge against groove 24 or merely twisting the skirt portion relative to the central part.

Thus, the device shown in Figures 6–8 operates as follows: The central part 16 of the closure is first formed in a first die member, the receptacle is then placed against the central part of the closure, and the first die member is seated on a second die member wherein the skirt portion 23 of the receptacle is formed and simultaneously molded to central part 10 and directly on the receptacle to be closed.

The method of injection forming plastic closure, described in relation to Figures 6–8 comprises generally the steps of forming the central part of a closure at a first station, moving said central part from said first station to a second station, and simultaneously forming and welding the peripheral skirt portion of said closure at said second station with said central part and directly on said receptacle.

In view of the foregoing description taken in conjunction with the accompanying drawings it is believed that a clear understanding of the device will be quite apparent to those skilled in this art. A more detailed description is accordingly deemed unnecessary.

However, it is noted that the plastic closure formed according to the invention may be made from distinct plastic compositions having varying properties such as different colors and a different finish or surface for decorative purposes; that the frangible construction of the closure may be entirely eliminated, and that obviously the mechanism for moving the platens, die members, or core member form no part of the present invention.

It is to be understood, however, that even though there is herein shown and described several preferred embodiments of the invention, the same is susceptible to certain changes fully comprehended by the spirit of the invention as herein described and the scope of the claims.

Having thus described the invention what is claimed as new is:

1. A molding apparatus for injection forming plastic closures for receptacles comprising a pair of platens defining a molding cavity therebetween when said platens are assembled, a rotatable core member for separating said molding cavity into two chambers when said platens are assembled, said receptacle having a portion adapted to be received in one of said chambers, and injection means for substantially simultaneously forcing plastic composition within said chambers, whereby a central plastic part of said closure is formed in one of said chambers against said core member and then upon rotation of said core member placed into said other chamber where the peripheral remainder of said central part is formed and welded to said central part directly over said portion of said receptacle.

2. A molding apparatus according to claim 1 comprising means for forming a frangible portion in said other chamber substantially between said central part and said peripheral remainder of said closure.

3. An injection molding apparatus for receptacle closures comprising a pair of laterally movable mold platens each including a mold cavity and provided with spaced openings for injecting the plastic, said mold platens when contiguous providing a continuous mold cavity, a central core carried by said mold platens and housed within said continuous mold cavity to divide said mold cavity into two molding chambers each communicating with one of said spaced openings, one of said molding chambers being substantially flat to thereby mold a disk shaped central part of the closure, the other of said molding chambers being substantially ring-shaped to thereby mold a ring-shaped remainder of the closure, means for angularly moving said core when said mold platens are laterally spaced to reverse the surfaces of said core in said molding chambers and carry the disk shaped central part of the closure from said one molding chamber into said other molding chamber whereby the remainder of the closure is formed and welded to the central part of the closure in said other molding chamber.

4. An injection molding apparatus constructed in accordance with claim 3, comprising a continuous rib provided in said mold platens and in said other molding chamber to provide the remainder of the closure formed with a frangible portion.

References Cited in the file of this patent
UNITED STATES PATENTS

| | | |
|---|---|---|
| 2,019,841 | Black et al. | Nov. 5, 1935 |
| 2,510,091 | Dofsen et al. | June 6, 1950 |
| 2,522,864 | De Groff | Sept. 18, 1950 |
| 2,577,350 | Morin | Dec. 4, 1951 |
| 2,587,327 | Jesnig | Feb. 26, 1952 |
| 2,609,570 | Danielson et al. | Sept. 9, 1952 |
| 2,714,949 | Morin | Aug. 9, 1955 |